3,422,452
CARBONYL-HALOSULFENYL HALIDES
AND PROCESS OF PREPARATION
Wolfgang Weiss, Cologne-Stammheim, Germany, assignor to Farbenfabriken Bayer Aktiengesellschaft, Leverkusen, Germany, a corporation of Germany
No Drawing. Filed Oct. 28, 1965, Ser. No. 512,257
Claims priority, application Germany, Nov. 11, 1964,
F 44,413
U.S. Cl. 260—544   9 Claims
Int. Cl. C07c 153/01

ABSTRACT OF THE DISCLOSURE $$CX_3SY + H_2O \xrightarrow[\text{acid}]{0-100°\ C.} O=C(X)-SY + 2HX$$

X and Y are the same or different halogens.

DESCRIPTION

This invention relates to carbonyl-halosulfenyl halides and to a process for the production thereof.

The present invention provides a process for the production of carbonyl-halosulfenyl halides, which comprises reacting a trihalomethyl-sulfenyl halide in an acid medium with at least one compound containing one or more OH-groups at temperatures between 0 and 100° C.

These compounds, i.e. carbonyl-halosulfenyl halides react like sulfenyl chlorides and other acid chlorides, such as phosgene and thiophosgene and thus can be used as basic chemicals in a large number of chemical reactions.

In French patent specification 1,372,971 there is described a process for the production of carbonyl-chlorosulfenyl chloride wherein methoxy dichloromethanesulfenyl chloride is heated to temperatures of between 50 and 150° C. The reaction can be promoted by the addition of suitable catalysts. This process however has the disadvantage that the starting product is obtainable only under very difficult conditions.

The carbonyl-halosulfenyl halides have the summation formula (COSXY)$_n$ in which X and Y represent like or different halogen atoms, advantageously fluorine, chlorine or bromine. Examination of the compound [ClC(O)SCl]$_n$ carried out by cryoscopy and mass spectroscopy shows that $n$ is 1, and in view of the chemical behaviour and examination of the structure by infrared spectroscopy, the constitutional formula

is attributed to the new compounds.

Excellent results can be produced when using sulfuric acid having a water content of 5 to 25% by weight as a compound containing OH-groups. Phosphoric acid, phosphorous acid and acetic acid in admixture with sulfuric acid can also be used in similar manner for the preparation of the carbonyl-halosulfenyl halides. The best yields are obtained when working with an excess of acid and in the presence of a quantity of water which is sufficient for the hydrolysis of the trihalomethyl-sulfenyl halide introduced, in accordance with the following reaction equation, which is set out below in respect of the preparation of carbonyl-chlorosulfenyl chloride from trichloromethyl-sulfenyl chloride:

(1) 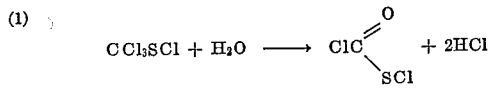

Carbonyl-chlorosulfenyl chloride can be prepared in an almost quantitative yield from trichloromethyl sulfenyl chloride with about 90% sulfuric acid and with 2 molecules of HCl being split off for each molecule of trichloromethyl-sulfenyl chloride which is used. The same compound is also obtained by hydrolysis of dichloromonofluoromethyl-sulfenyl chloride with one molecule of HF and one molecule of HCl being split off per molecule of CCl$_2$FSCl introduced (see Equation 2):

(2) 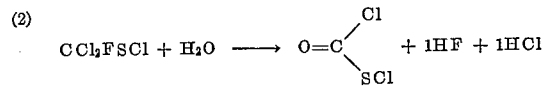

Other compounds of this new class can be prepared according to the invention, for example carbonyl-chlorosulfenyl bromide can be obtained from trichloromethyl-sulfenyl bromide. Whereas carbonyl-chlorosulfenyl chloride is a stable compound and can be purified by distillation without decomposition, carbonyl-chlorosulfenyl bromide is decomposed relatively quickly at above room temperature in accordance with the equation:

(3) 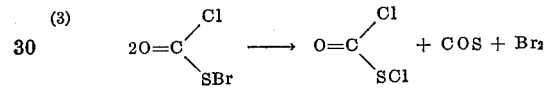

The preparation of the trihalomethyl-sulfenyl halides is known. For example, CCl$_3$SCl can be prepared from carbon disulfide and chlorine according to G. M. Dyson, Org. Synth., vol. I, 506 (1932). Cl$_3$SBr is obtained from CCl$_3$SCl and aqueous HBr in accordance with German published specification 1,058,502. CCl$_2$FSCl can be obtained by the process of K. A. Petrov, A. A. Nejmyseva, Z. Obsc. Chim. 29 (1959), No. 10, p. 3401–3403.

The following examples illustrate the invention.

EXAMPLE 1

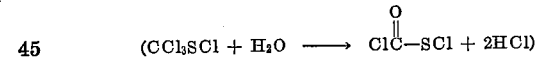

211 (approximately 200) ml. of concentrated H$_2$SO$_4$, 18 g. of water and 186 g. (1 mol) of trichloromethyl-sulfenyl chloride were heated with vigorous stirring to 45–50° C. After 1–1½ hours, almost 2 molecules of HCl had been split off and the evolution of HCl subsided. The two layers of the reaction material were separated in a separating funnel. The light phase represented the crude product, which had a high degree of purity. It could be purified still further by distillation.

Yield: with use of fresh sulfuric acid=85%; with re-use of the sulfuric acid layer of a previous batch=95% of the theoretical.

The compound

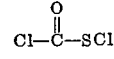

is a yellow liquid with a molecular weight of 130.99.

| | Analysis | |
|---|---|---|
| | Values found | Values theoretical |
| B.P. 760=98° C | C, 9.15; 9.18 | 9.17 |
| d$_{20}^{22}$=1.569 | S, 24.60; 24.65 | 24.48 |
| n$_D^{20.5}$=1.5158 | Cl, 54.2; 54.3 | 54.14 |

The infra-red spectrum of the substance, dissolved in carbon disulfide, has the following main absorption bands at: 1789 cm.$^{-1}$, 807 cm.$^{-1}$, 587 cm.$^{-1}$, 542 cm.$^{-1}$.

In a mass spectrograph the substance with an electron energy of 70 ev. showed the following masses with the indicated relative intensities:

| Unit of mass— | Relative intensity in percent |
|---|---|
| 32 | 41.2 |
| 60 | 100 |
| 63 | 41.2 |
| 65 | 13.4 |
| 67 | 32.8 |
| 69 | 12.3 |
| 95 | 29.0 |
| 97 | 10.7 |
| 130 | 21.5 |
| 132 | 15.0 |

EXAMPLE 2

Continuous preparation of carbonyl-chlorosulfenyl chloride 850 ml./h. of concentrated H$_2$SO$_4$, 440 ml./h. of trichloromethyl-sulfenyl chloride and 72 ml./h. of H$_2$O were reacted together. The reaction mixture was allowed to pass at 50° C. through three series-connected stirrer-type vessels which were interconnected by an overflow, the volume of each vessel being 200 ml. The components could also be introduced separately in measured quantities. The waste gases left the vessels through efficient condensers (best of all at −10° C.) The reaction material was separated in a settler, the sulfuric acid layer (with replenishment of the losses) being introduced again as concentrated H$_2$SO$_4$ and the crude product was distilled, possibly also continuously. The yield was 95%.

EXAMPLE 3

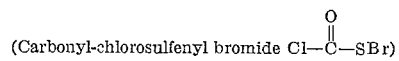
(Carbonyl-chlorosulfenyl bromide Cl—C(=O)—SBr)

183 ml. of concentrated H$_2$SO$_4$, 15 ml. of H$_2$O and 200 g. of CCl$_3$SBr were heated with vigorous stirring to about 40° C. After 1–1½ hours, approximately the equivalent quantity of acid was split off. Cooling was carried out, the layers were separated and there were obtained 150 g. of a reddish-brown oil with the density $d$=2.13. For purifying the very readily decomposable product, the brown oil was heated under a vacuum of 2–5 mm. Hg up to a maximum of 30° C. The compound was obtained with a good degree of purity in a water-cooled condenser.

The infra-red spectrum of the substance, dissolved in carbon disulfide, had the main absorption bands at: 1787 cm.$^{-1}$ and 798 cm.$^{-1}$.

I claim:
1. A process for the production of carbonylhalosulfenyl halides which comprises hydrolyzing a trihalomethylsulfenyl halide of the formula:

CX$_3$SY wherein X and Y are members of the group consisting of fluorine, chlorine, and bromine and mixtures thereof in an acid medium selected from the group consisting of sulfuric acid and phosphoric acid in the presence of water at a temperature of about 40–50° C. whereby two mols of hydrogen halide per mol of trihalomethylsulfenyl halide are split off.

2. Process for the production of carbonyl-halosulfenyl halides which comprises hydrolyzing a trihalomethylsulfenyl halide of the formula:

CX$_3$SY wherein X and Y are members of the group consisting of fluorine, chlorine, and bromine and mixtures thereof in an acid medium selected from the group consisting of sulfuric acid and phosphoric acid in the presence of water at temperatures between 0 and 100° C., whereby two mols of hydrogen halide per mol of trihalomethylsulfenyl halide are split off.

3. Process according to claim 2, wherein the water is present in an amount to form two mols of hydrogen halide per mol of trihalomethylsulfenyl halide used.

4. Process according to claim 1 wherein the water is present in an amount to form two mols of hydrogen halide per mol of trihalomethylsulfenyl halide used.

5. Process according to claim 2 wherein the acid medium is sulfuric acid.

6. Process according to claim 1, wherein the acid medium is sulfuric acid.

7. A compound of the formula

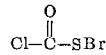

8. Process according to claim 2, wherein the acid medium is a mixture of concentrated sulfuric acid containing 5 to 25% by weight of water.

9. Process according to claim 1 wherein the acid medium is a mixture of concentrated sulfuric acid containing 5 to 25% by weight of water.

References Cited

UNITED STATES PATENTS 3,177,248  4/1965  Freedman _____ 260—544

OTHER REFERENCES

Bohme et al.: "Deutsch Chem Ber," vol. 76, No. 5 (1943), pp. 483–486 (p. 485 relied on).

Gutmann: "Fresenium' Zeitschrift Fur Anal. Chemie," vol 71 (1927), p. 43–45.

Sosnovsky: "Chemo. Rev.," vol. 58 (1958), pp. 509–540 (pp. 512 and 516–518 relied on).

Horak: "Call. Czech. Chem. Comm.," vol. 28 (1963), pp. 2328–2336.

LORRAINE A. WEINBERGER, *Primary Examiner.*

J. NIELSEN, *Assistant Examiner.*

UNITED STATES PATENT OFFICE
CERTIFICATE OF CORRECTION

Patent No. 3,422,452　　　　　　　　　　　　　　　　　　January 14, 1969

Wolfgang Weiss

It is certified that error appears in the above identified patent and that said Letters Patent are hereby corrected as shown below:

Column 3, last line, the formula "C4₃SY" should read -- CX₃SY --.

Column 4, lines 4 and 16, "acid and phosphoric", each occurrence, should read -- acid, mixtures of sulfuric acid and phosphoric acid, mixtures of sulfuric acid and phosphorous acid and mixtures of sulfuric acid and acetic --.

Signed and sealed this 17th day of March 1970.

(SEAL)
Attest:

Edward M. Fletcher, Jr.
Attesting Officer

WILLIAM E. SCHUYLER, JR.
Commissioner of Patents